United States Patent
Struik

(10) Patent No.: US 10,999,291 B2
(45) Date of Patent: *May 4, 2021

(54) METHOD AND APPARATUS FOR PROVIDING AN ADAPTABLE SECURITY LEVEL IN AN ELECTRONIC COMMUNICATION

(71) Applicant: Certicom Corp., Mississauga (CA)

(72) Inventor: Marinus Struik, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,269

(22) Filed: Jul. 1, 2019

(65) Prior Publication Data

US 2019/0394207 A1    Dec. 26, 2019

Related U.S. Application Data

(63) Continuation of application No. 15/811,194, filed on Nov. 13, 2017, now Pat. No. 10,341,356, which is a
(Continued)

(51) Int. Cl.
*H04L 29/06* (2006.01)
*H04L 9/08* (2006.01)
(Continued)

(52) U.S. Cl.
CPC ............ *H04L 63/105* (2013.01); *H04L 9/088* (2013.01); *H04L 63/0428* (2013.01);
(Continued)

(58) Field of Classification Search
CPC ..... H04L 63/08; H04L 63/123; H04L 63/164; H04L 63/105; H04L 63/0428; H04L 9/00; H04L 9/088; H04W 12/02
See application file for complete search history.

(56) References Cited

U.S. PATENT DOCUMENTS 5,099,517 A    3/1992 Gupta et al.
5,301,287 A    4/1994 Herrell et al.
(Continued)

FOREIGN PATENT DOCUMENTS

EP    1320010    6/2003
EP    1324541    7/2003
(Continued)

OTHER PUBLICATIONS

Chooi-Tian Lee and J. W. Harris, "Principle and technique for encapsulation of user control and data information in separate frames," Proceedings of LCN—21st Annual Conference on Local Computer Networks, Minneapolis, MN, USA, 1996, pp. 384-393. (Year: 1996).*
(Continued)

*Primary Examiner* — Kari L Schmidt
(74) *Attorney, Agent, or Firm* — Fish & Richardson P.C.

(57) ABSTRACT

A method of communicating in a secure communication system, comprises the steps of assembling a message at a sender, then determining a security level, and including an indication of the security level in a header of the message. The message is then sent to a recipient.

19 Claims, 3 Drawing Sheets

Related U.S. Application Data continuation of application No. 15/215,187, filed on Jul. 20, 2016, now Pat. No. 9,819,686, which is a continuation of application No. 14/877,072, filed on Oct. 7, 2015, now Pat. No. 9,419,983, which is a continuation of application No. 14/477,637, filed on Sep. 4, 2014, now Pat. No. 9,191,395, which is a continuation of application No. 10/885,115, filed on Jul. 7, 2004, now Pat. No. 8,862,866.

(60) Provisional application No. 60/484,656, filed on Jul. 7, 2003.

(51) Int. Cl.
  *H04L 9/00* (2006.01)
  *H04W 12/02* (2009.01)
  *H04W 12/67* (2021.01)

(52) U.S. Cl.
  CPC ............ *H04L 63/08* (2013.01); *H04L 63/123* (2013.01); *H04L 63/164* (2013.01); *H04L 9/00* (2013.01); *H04L 63/162* (2013.01); *H04W 12/02* (2013.01); *H04W 12/67* (2021.01)

(56) References Cited

U.S. PATENT DOCUMENTS

| | | |
|---|---|---|
| 5,450,493 A | 9/1995 | Maher |
| 5,553,083 A * | 9/1996 | Miller .................. H04L 1/1614 714/748 |
| 5,559,883 A | 9/1996 | Williams |
| 5,615,261 A | 3/1997 | Grube et al. |
| 5,638,448 A | 6/1997 | Nguyen |
| 5,689,566 A | 11/1997 | Nguyen |
| 5,727,002 A | 3/1998 | Miller et al. |
| 5,832,228 A | 11/1998 | Holden et al. |
| 6,044,062 A | 3/2000 | Brownrigg |
| 6,101,543 A | 8/2000 | Alden et al. |
| 6,108,583 A | 8/2000 | Schneck et al. |
| 6,118,775 A | 9/2000 | Kari et al. |
| 6,249,820 B1 | 6/2001 | Dobbins |
| 6,272,632 B1 | 8/2001 | Carman et al. |
| 6,292,900 B1 | 9/2001 | Ngo |
| 6,493,824 B1 | 12/2002 | Novoa |
| 6,510,349 B1 | 1/2003 | Schneck et al. |
| 6,516,416 B2 | 2/2003 | Gregg |
| 6,654,346 B1 | 11/2003 | Mahalingaiah |
| 6,697,857 B1 | 2/2004 | Dixon |
| 6,728,243 B1 | 4/2004 | Jason, Jr. |
| 6,732,279 B2 | 5/2004 | Hoffman |
| 6,754,214 B1 | 6/2004 | Mahalingaiah |
| 6,760,768 B2 | 7/2004 | Holden et al. |
| 6,782,473 B1 | 8/2004 | Park |
| 6,792,111 B1 | 9/2004 | Italia |
| 6,865,426 B1 | 3/2005 | Schneck et al. |
| 6,918,034 B1 | 7/2005 | Sengodan et al. |
| 6,928,544 B2 | 8/2005 | Chu |
| 7,010,681 B1 | 3/2006 | Fletcher et al. |
| 7,016,948 B1 | 3/2006 | Yildiz |
| 7,023,863 B1 | 4/2006 | Naudus et al. |
| 7,024,609 B2 | 4/2006 | Wolfgang et al. |
| 7,031,309 B1 | 4/2006 | Sautter |
| 7,036,015 B2 | 4/2006 | Vanstone et al. |
| 7,068,791 B1 | 6/2006 | Larsen |
| 7,107,335 B1 | 9/2006 | Arcieri et al. |
| 7,143,137 B2 | 11/2006 | Maufer et al. |
| 7,233,948 B1 | 6/2007 | Shamoon et al. |
| 7,290,288 B2 | 10/2007 | Gregg |
| 7,302,564 B2 | 11/2007 | Berlin |
| 7,412,726 B1 | 8/2008 | Viswanath |
| 7,437,548 B1 | 10/2008 | Alfieri |
| 7,447,313 B2 | 11/2008 | Van Rijnsoever |
| 7,467,406 B2 | 12/2008 | Cox et al. |
| 7,526,807 B2 | 4/2009 | Chao et al. |
| 7,600,038 B2 | 10/2009 | Struik |
| 7,657,531 B2 | 2/2010 | Bisbee et al. |
| 7,660,986 B1 | 2/2010 | Qiu et al. |
| 7,721,324 B1 | 5/2010 | Jackson |
| 7,965,843 B1 | 6/2011 | Maino et al. |
| 8,069,483 B1 | 11/2011 | Matlock |
| 8,438,629 B2 | 5/2013 | Lee et al. |
| 9,172,629 B1 | 10/2015 | McRae |
| 9,774,609 B2 | 9/2017 | Struik |
| 10,341,356 B2 | 7/2019 | Struik |
| 10,637,869 B2 | 4/2020 | Struik |
| 2001/0043577 A1 | 11/2001 | Barany et al. |
| 2002/0035635 A1 | 3/2002 | Holden et al. |
| 2002/0076049 A1 * | 6/2002 | Boykin .......... H04N 21/234327 380/211 |
| 2002/0078227 A1 | 6/2002 | Kronenberg |
| 2002/0090086 A1 | 7/2002 | Van Rijnsoever |
| 2002/0094087 A1 | 7/2002 | Dellmo et al. |
| 2002/0174352 A1 | 11/2002 | Dahl |
| 2002/0176433 A1 | 11/2002 | Zhu et al. |
| 2002/0181493 A1 | 12/2002 | Hsu et al. |
| 2003/0012163 A1 | 1/2003 | Cafarelli |
| 2003/0026255 A1 | 2/2003 | Poeluev et al. |
| 2003/0035542 A1 | 2/2003 | Kim |
| 2003/0073406 A1 | 4/2003 | Benjamin |
| 2003/0119484 A1 | 6/2003 | Adachi et al. |
| 2003/0147369 A1 | 8/2003 | Singh et al. |
| 2003/0156586 A1 | 8/2003 | Lee |
| 2003/0159036 A1 | 8/2003 | Walmsley et al. |
| 2003/0226011 A1 | 12/2003 | Kuwano et al. |
| 2004/0010691 A1 | 1/2004 | Nelson |
| 2004/0015720 A1 | 1/2004 | Dubuque |
| 2004/0028409 A1 | 2/2004 | Kim et al. |
| 2004/0047324 A1 | 3/2004 | Diener |
| 2004/0062224 A1 | 4/2004 | Brownrigg |
| 2004/0136513 A1 | 7/2004 | Chiu et al. |
| 2004/0136527 A1 | 7/2004 | Struick |
| 2004/0139312 A1 | 7/2004 | Medvinsky |
| 2004/0160903 A1 | 8/2004 | Gai |
| 2004/0218683 A1 | 11/2004 | Batra |
| 2004/0223615 A1 | 11/2004 | Dhawan et al. |
| 2004/0255001 A1 | 12/2004 | Oh et al. |
| 2005/0015583 A1 | 1/2005 | Sarkkinen et al. |
| 2005/0076197 A1 | 4/2005 | Struik |
| 2005/0081032 A1 | 4/2005 | Struik |
| 2005/0086501 A1 | 4/2005 | Woo et al. |
| 2005/0097357 A1 | 5/2005 | Smith |
| 2005/0108746 A1 | 5/2005 | Futagami et al. |
| 2005/0132193 A1 | 6/2005 | Ishidoshiro et al. |
| 2006/0050708 A1 | 3/2006 | Shapiro |
| 2006/0064736 A1 | 3/2006 | Ahuja et al. |
| 2006/0075480 A1 | 4/2006 | Noehring |
| 2006/0077997 A1 | 4/2006 | Yamaguchi |
| 2006/0112431 A1 | 5/2006 | Finn et al. |
| 2006/0136715 A1 | 6/2006 | Han |
| 2006/0140400 A1 | 6/2006 | Brown et al. |
| 2006/0168255 A1 | 7/2006 | Katz et al. |
| 2006/0210071 A1 | 9/2006 | Chandran et al. |
| 2006/0236365 A1 | 10/2006 | Pham |
| 2007/0058633 A1 | 3/2007 | Chen et al. |
| 2007/0086397 A1 | 4/2007 | Taylor |
| 2007/0160059 A1 | 7/2007 | Poeluev et al. |
| 2007/0192596 A1 | 8/2007 | Otsuka |
| 2007/0195788 A1 | 8/2007 | Vasamsetti et al. |
| 2007/0255954 A1 | 11/2007 | Struik |
| 2008/0177997 A1 | 7/2008 | Morais et al. |
| 2008/0307524 A1 | 12/2008 | Singh et al. |
| 2009/0007226 A1 | 1/2009 | Fujii |
| 2009/0290635 A1 | 11/2009 | Kim |
| 2009/0319775 A1 | 12/2009 | Buer et al. |
| 2011/0106956 A1 | 5/2011 | Luo |
| 2011/0209196 A1 | 8/2011 | Kennedy |
| 2011/0264915 A1 | 10/2011 | Cam-Winget et al. |

(56) References Cited

U.S. PATENT DOCUMENTS

2019/0052646 A1 2/2019 Struik
2020/0244669 A1 7/2020 Struik

FOREIGN PATENT DOCUMENTS

| EP | 1326157 | 7/2003 |
|---|---|---|
| WO | 2000010304 | 2/2000 |
| WO | 2003036857 | 5/2003 |
| WO | 2005081032 | 9/2005 |
| WO | 2005083970 | 9/2005 |

OTHER PUBLICATIONS

Non-final office action issued in U.S. Appl. No. 16/153,676 dated Sep. 16, 2019, 17 pages.
Notice of allowance issued in U.S. Appl. No. 16/153,676 dated Dec. 18, 2019, 7 pages.
Cam-Winget et al. "Security Flaws in 802.11 Data Link Protocols" Communications of the ACM 46.5 (May 2003) pp. 35-39.
Dierks, T. et al.; "The TLS Protocol"; RFC 2246; IETF; Jan. 1999; pp. 23, 28-30.
Hura et al.; "Data and Computer Communications: Networking and Internetworking"; CRC Press, 2001; pp. 337, 450, 453, 467, 471, 483, 484, 485, 489, 491, 526, 599, 609, 617, 618, 621, 937, 1086, 1117, 1118, 1132.
IEEE Standard 802.11; Standard for Telecommunications and Information Exchange between Systems—Local and Metropolitan Networks—Specific Requirements—Part 11: Wireless LAN Medium Access Control (MAC) and Physical Layer (PHY) Specifications; IEEE Press; 1999; pp. 34-41, 50-58.
Kent, S. et al.; "IP Authentication Header"; RFC 2402; IETF; Nov. 1998; 21 pages.
Kent, S. et al.; "Security Architecture for the Internet Protocol"; RFC 2401; IETF; Nov. 1998; 62 pages.
Oppliger; "Security at the Internet Layer" Computer 31.9 (1998) pp. 43-47.
Specification of the Bluetooth System; Specification vol. 1—Core, Version 1.0B; Dec. 1, 1999; p. 160.
Sung et al.; "Design and Evaluation of Adaptive Secure Protocol for E-Commerce"; Proceedings of the 10th International Conference on Computer Communications and Networks; Oct. 15-17, 2001; pp. 32-39.
"Transmission Control Protocol"; RFC 0793; Darpa Internet Program; Information Sciences Institute; University of Southern California; Sep. 1981.
Kent, Stephen T., "Internet privacy enhanced mail," Communications of the ACM 36.8 (1993): 48-60.
Li, Renqi, and E. A. Unger, "Security issues with TCP/IP," ACM SIGAPP Applied Computing Review 3.1 (1995): 6-13.
LeMay, Michael D., and Jack SE Tan, "Comprehensive message control and assurance with the secure email transport protocol," Electro/Information Technology Conference, 2004. EIT2004. IEEE. IEEE, (2004): 272-280.
SunScreen 3.2 Administrator's Overview, Sep. 2001, pp. 1-356.
Kim et al., "Internet Multicast Provisioning Issues for Hierarchical Architecture," Oct. 2001, Proceedings of the Ninth IEEE International Conference on Networks, pp. 401-404.
Scheikl et al., Multi-level Secure Multicast: The Rethinking of Secure Locks, Aug. 2002, International Conference on Parallel Processing Workshop, pp. 17-24.
Messerges, Thomas S., et al. "A security design for a general purpose, self-organizing, multihop ad hoc wireless network," Proceedings of the 1st ACM workshop on Security of ad hoc and sensor networks. ACM, 2003, pp. 1-11.
A. Wool, "A note on the fragility of the "Michael" message integrity code," in IEEE Transactions on Wireless Communications, vol. 3, No. 5, pp. 1459-1462, Sep. 2004.
"Internet Protocol," Request for Comments (RFC) 791, Darpa Internet Program, Protocol Specification, Sep. 1981, 45 pages.
"IP Encapsulating Security Payload (ESP)," Request for Comments (RFC) 2406, Network Working Group, Nov. 1998, 19 pages.
"Internet Protocol, Version 6 (IPv6)," Request for Comments (RFC) 2460, Network Working Group, Nov. 1998, 34 pages.
Cisco Press, "Internetworking Technology Overview," Jun. 1999, 448 pages.
Katsavos et al.,"Security protocol for Frame Relay," ACM SIGCOMM Computer Communication Review, vol. 23, No. 5, Oct. 1993, 17-35, 19 pages.
Lee et al., "Principle and technique for encapsulation of user control and data information in separate frames ," Proceedings of LCN—21st Annual Conference on Local Computer Networks, IEEE, Oct. 2013, 384-393, 10 pages.
United States Advisory Action in U.S. Appl. No. 10/885,115, dated Aug. 25, 2010, 3 pages.
United States Advisory Action in U.S. Appl. No. 10/885,115, dated Aug. 28, 2008, 3 pages.
United States Examiner's Answer to Appeal Brief in U.S. Appl. No. 10/921,161, dated Feb. 21, 2012, 30 pages.
United States Notice of Allowance in U.S. Appl. No. 10/885,115, dated Jan. 15, 2014, 24 pages.
United States Notice of Allowance in U.S. Appl. No. 10/885,115, dated Jun. 11, 2014.
United States Notice of Allowance in U.S. Appl. No. 10/921,161, dated Apr. 12, 2012, 9 pages.
United States Notice of Allowance in U.S. Appl. No. 11/735,055, dated Nov. 25, 2013, 23 pages.
United States Notice of Allowance in U.S. Appl. No. 13/551,869, dated Sep. 27, 2013, 9 pages.
United States Office Action in U.S. Appl. No. 10/885,115, dated Aug. 22, 2007, 10 pages.
United States Office Action in U.S. Appl. No. 10/885,115, dated Jan. 21, 2011, 13 pages.
United States Office Action in U.S. Appl. No. 10/885,115, dated Jul. 1, 2013, 17 pages.
United States Office Action in U.S. Appl. No. 10/885,115, dated Jun. 23, 2008, 13 pages.
United States Office Action in U.S. Appl. No. 10/885,115, dated Jun. 4, 2010, 13 pages.
United States Office Action in U.S. Appl. No. 10/885,115, dated May 8, 2009, 18 pages.
United States Office Action in U.S. Appl. No. 10/885,115, dated Oct. 11, 2011, 14 pages.
United States Office Action in U.S. Appl. No. 10/885,115, dated Oct. 2, 2009, 16 pages.
United States Office Action in U.S. Appl. No. 10/885,115, dated Oct. 27, 2008, 16 pages.
United States Office Action in U.S. Appl. No. 10/921,161, dated Aug. 18, 2010, 27 pages.
United States Office Action in U.S. Appl. No. 10/921,161, dated Dec. 9, 2009, 25 pages.
United States Office Action in U.S. Appl. No. 10/921,161, dated Jan. 27, 2011, 30 pages.
United States Office Action in U.S. Appl. No. 10/921,161, dated Mar. 25, 2008, 24 pages.
United States Office Action in U.S. Appl. No. 10/921,161, dated Nov. 25, 2008, 30 pages.
United States Office Action in U.S. Appl. No. 11/735,055, dated Dec. 11, 2012, 15 pages.
United States Office Action in U.S. Appl. No. 11/735,055, dated Dec. 22, 2010, 14 pages.
United States Office Action in U.S. Appl. No. 11/735,055, dated Feb. 17, 2012, 14 pages.
United States Office Action in U.S. Appl. No. 11/735,055, dated Jul. 13, 2010, 21 pages.
United States Office Action in U.S. Appl. No. 11/735,055, dated May 24, 2013, 16 pages.
United States Office Action in U.S. Appl. No. 13/551,869, dated Apr. 2, 2013, 11 pages.
United States Office Action in U.S. Appl. No. 14/152,055, dated Mar. 13, 2015, 24 pages.
Office Action issued in U.S. Appl. No. 15/595,542 dated Nov. 22, 2017; 22 pages.

(56) References Cited

OTHER PUBLICATIONS

Office Action issued in U.S. Appl. No. 15/595,542 dated Feb. 23, 2018, 14 pages.
Office Action issued in U.S. Appl. No. 15/811.194 dated Mar. 8, 2018, 28 pages.
United States Advisory Action issued in U.S. Appl. No. 15/595,542, dated Apr. 30, 2018, 3 pages.
Notice of Allowance issued in U.S. Appl. No. 15/595,542 dated May 25, 2018, 9 pages.
Final Office Action issued in U.S. Appl. No. 15/811,194 dated Sep. 7, 2018, 34 pages.
Interview Summary issued in U.S. Appl. No. 15/811,194 dated Oct. 12, 2018, 3 pages.
Advisory Action issued in U.S. Appl. No. 15/811,194 dated Nov. 28, 2018, 4 pages.
Interview Summary issued in U.S. Appl. No. 15/811,194 dated Nov. 20, 2018, 1 page.
Interview Summary issued in U.S. Appl. No. 15/811,194 dated Feb. 14, 2019, 1 page.
Notice of Allowance issued in U.S. Appl. No. 15/811,194 dated Feb. 14, 2019, 14 pages.
Canadian Office Action in Canadian Application No. 2,434,992, dated Sep. 14, 2011, 3 pages.
Canadian Office Action in Canadian Application No. 2,434,992, dated Dec. 5, 2012, 2 pages.
Canadian Notice of Allowance in Canadian Application No. 2,434,992, dated Dec. 9, 2013, 1 page.
Canadian Office Action in Canadian Application No. 2,478,274, dated Feb. 3, 2012, 2 pages.
Canadian Office Action in Canadian Application No. 2,478,274, dated Mar. 14, 2013, 3 pages.
Canadian Office Action in Canadian Application No. 2,478,274, dated Jan. 7, 2014, 2 pages.
Canadian Office Action in Canadian Application No. 2,644,015, dated May 23, 2012, 3 pages.
Canadian Office Action in Canadian Application No. 2,644,015, dated Nov. 4, 2013, 4 pages.
Canadian Office Action in Canadian Application No. 2,644,015, dated Jan. 22, 2015, 5 pages.
Office Action issued in Canadian Application No. 2941216 dated May 30, 2017.
Notice of Allowance in Canadian Application No. 2941216 dated Apr. 30, 2018, 5 pages.
Office Action issued in Chinese Application No. 201310067350.5 dated May 4, 2016.
Extended European Search Report in European Patent Application No. 07719535.2, dated May 13, 2011, 6 pages.
European Communication Pursuant to Article 94(4) EPC in European Application No. 07719535.2, dated Feb. 17, 2012, 5 pages.
European Communication Pursuant to Article 94(4) EPC in European Application No. 07719535.2, dated Mar. 8, 2013, 5 pages.
European Communication Pursuant to Article 94(4) EPC in European Application No. 07719535.2, dated Feb. 7, 2014, 7 pages.
Communication under Rule 71(3) EPC issued in European Application No. 07719535.2 dated Apr. 23, 2015.
Summons to Attend Oral Proceedings Pursuant to Rule 115(1) EPC issued in European Application No. 07719535.2 on Jun. 7, 2017—new art cited.
International Search Report and Written Opinion in International Application No. PCT/CA2007/000608, dated Aug. 28, 2007, 4 pages.
Non-Final Office Action issued in U.S. Appl. No. 16/852,179 dated Jan. 15, 2021, 19 pages.

\* cited by examiner

METHOD AND APPARATUS FOR PROVIDING AN ADAPTABLE SECURITY LEVEL IN AN ELECTRONIC COMMUNICATION

CLAIM OF PRIORITY

This application is a continuation of and claims priority to U.S. application Ser. No. 15/811,194 filed on Nov. 13, 2017, which is a continuation of and claims priority to U.S. application Ser. No. 15/215,187 filed on Jul. 20, 2016, which is a continuation of and claims priority to U.S. application Ser. No. 14/877,072, filed on Oct. 7, 2015, now U.S. Pat. No. 9,419,983, which is a continuation of and claims priority to U.S. application Ser. No. 14/477,637, filed on Sep. 4, 2014, now U.S. Pat. No. 9,191,395, which is a continuation of and claims priority to U.S. application Ser. No. 10/885,115, filed on Jul. 7, 2004, now U.S. Pat. No. 8,862,866, which claims priority from U.S. Provisional Patent Application No. 60/484,656 filed on Jul. 7, 2003. The entire contents of which is hereby incorporated by reference for all purposes.

BACKGROUND OF THE INVENTION

Field of the Invention

The present application relates to a method and apparatus for providing an adaptable security level in an electronic communication.

Description of the Prior Art

In electronic communications, it is often necessary to prevent an eavesdropper from intercepting message. It is also desirable to indicate authenticity of a message, which is a verifiable identification of sender. These goals are usually achieved by using cryptography. Private key cryptography requires sharing a secret key prior to initiating communications. Public key cryptography is generally preferred as it does not require such a shared secret key. Instead, each correspondent has a key pair including a private key and a public key. The public key may be provided by any convenient means, and does not need to be kept secret.

There are many variations in cryptographic algorithms, and various parameters that determine precise implementation. In standards for wireless communications, it has been customary to set these parameters in advance for each frame type. However, this approach limits the flexibility of the parameters.

When one device is communicating with several other devices, it will often need to establish separate parameters for each communication.

It is an object of the present invention to obviate or mitigate the above disadvantages.

SUMMARY OF THE INVENTION

In accordance with one aspect of the present invention, there is provided a method of communicating in a secure communication system, comprising the steps of assembling as message at a sender, then determining a security level, and including an indication of the security level in a header of the message. The message is then sent to a recipient.

BRIEF DESCRIPTION OF DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
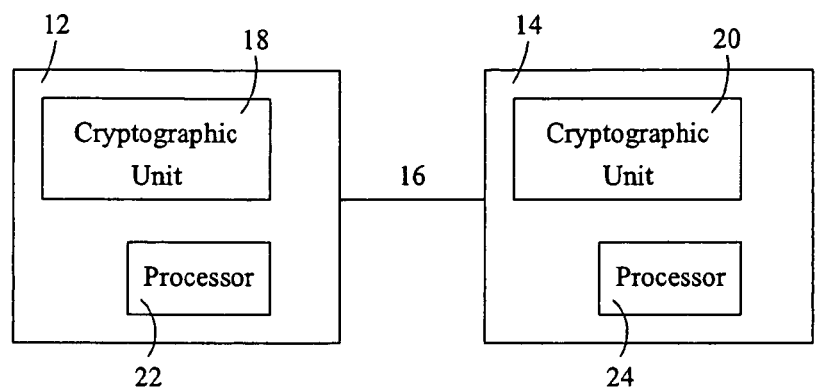
FIG. 1 is a schematic representation of a communication system.

Referring to FIG. 1, a communication system 10 includes a pair of correspondents 12, 14 connected by a communication link 16. Each correspondent 12, 14 includes a respective cryptographic unit 18, 20 respectively.

Each correspondent 12, 14 can include a processor 22, 24. Each processor may be coupled to a display screen and to user input devices, such as a keyboard, mouse, or other suitable devices. If the display is touch sensitive, then the display itself can be employed as the user input device. A computer readable storage medium is coupled to each processor 22, 24 for providing instructions to the processor 22, 24 to instruct and/or configure processor 22, 24 to instruct and/or configure processor 22, 24 to perform steps or algorithms related to the operation of each correspondent 12, 14, as further explained below. The computer readable medium can include hardware and/or software such as, by way of example only, magnetic disks, magnetic tape, optically readable medium such as CD ROM's, and semiconductor memory such as PCMCIA cards. In each case, the medium may take the form of a portable item such as a small disk, floppy diskette, cassette, or it may take the form of a relatively large or immobile item such as hard disk drive, solid state memory card, or RAM provided in a support system. It should be noted that the above listed example mediums can be used either alone or in combination.

Figure 2:
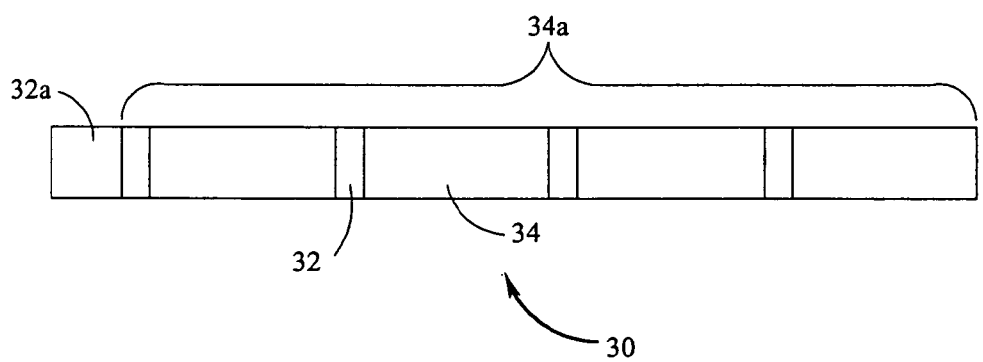
FIG. 2 is a schematic representation of an information frame exchanged in the communication system of FIG. 1.
Figure 3:
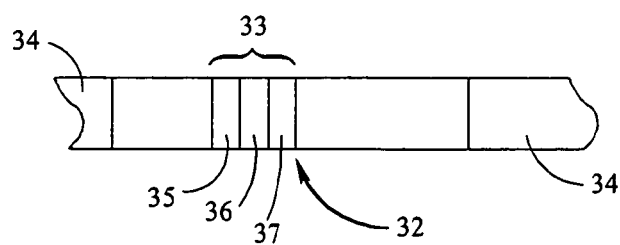
FIG. 3 is a schematic representation of a frame control portion of the frame in FIG. 2.

In order to transfer data between correspondents 12, 14, a packet stream 30 is assembled at one of the correspondents in accordance with a defined protocol. The packet stream 30 is shown schematically in FIG. 2 and is composed of one or more frames 31, each of which has a header 32 and data 34. In some protocols, the packet may itself be organized as a frame with a header 32a and data 34a consisting of a collection of individual frames. The header 32 is made up of a string of bits and contains control information at specified locations within the bit stream.

Included in each of the headers 34 are security control bits 33, that included a security mode bit 35 and integrity level bits 36, 37.

In this embodiment, security bit mode 35 is used to indicate whether encryption mode is on or off. Security bits 36 and 37 together are used to indicate which of four integrity levels, such as 0, 32, 64, or 128 bit key size is utilized. The security mode bit may be used to indicate alternative modes of operation, such as, authentication and the number of bits may be increased to accommodate different combinations. It will be recognized that providing security bits in each frame 31 of the stream 30 allows the security level to be on a frame-by-frame basis rather than on the basis of a pair of correspondents, therefore providing greater flexibility in organizing communications.

In order to provide security, certain minimum security levels may be used. These levels should be decided upon among all correspondents through an agreed-upon rule. This rule may be static or dynamic.

Figure 4:
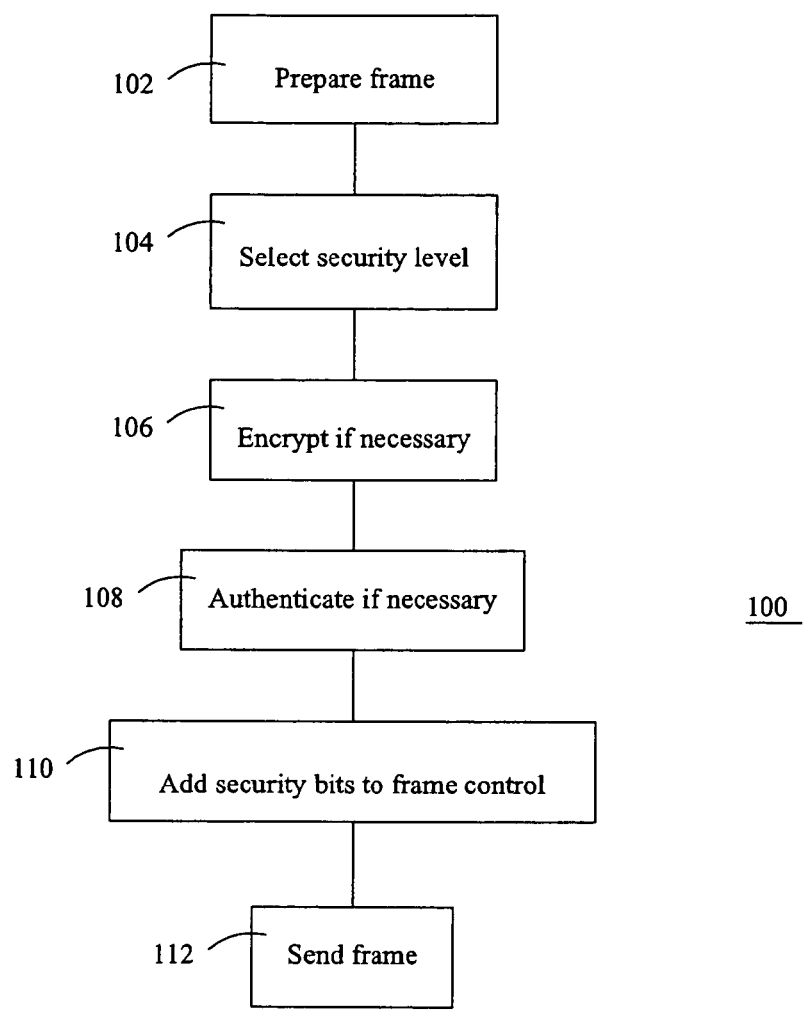
FIG. 4 is a schematic representation of a method performed by a sender in FIG. 1.

In operation, the correspondent 12 performs the steps shown in FIG. 4 by the numeral 100 to send information to the correspondent 14. First, the correspondent 12 prepares data and a header at step 102. Then selects the security level at step 104. The security level is determined by considering the minimum security level required by the recipient, the nature of the recipient, and kind of data being transmitted. If the security level includes encryption, then the correspondent 12 encrypts the data at step 106. If the security level includes authentication, then the correspondent 12 signs the data at step 108. Then the correspondent 12 includes bits indicating the security mode and security level in the frame control at step 110. The correspondent 12 then sends the frame to the correspondent 14.

Figure 5:
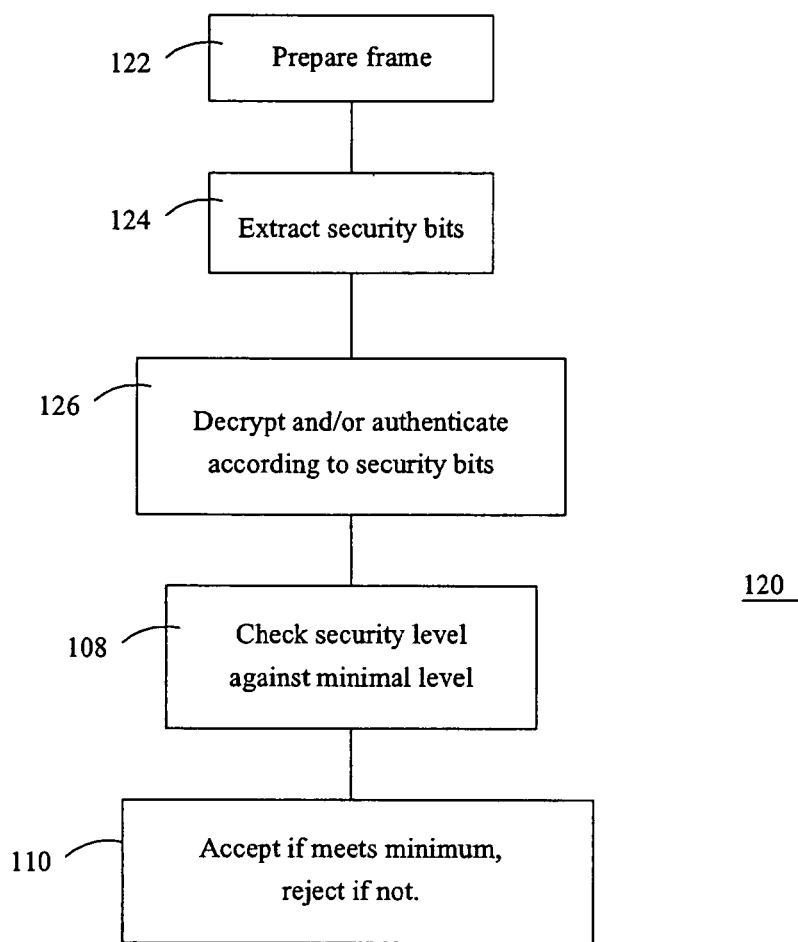
FIG. 5 is a schematic representation of a method performed by a recipient in FIG. 1.

Upon receiving the frame, the correspondent 14 performs the steps shown in FIG. 5 by the numeral 120. The correspondent 14 first receives the frame at step 122. It then extracts the security bits at step 124. If the mode security bit 34 indicate encryption, then the correspondent 14 decrypts the data at step 126. If the security bits indicate authentication, then the correspondent 14 verifies the signature at step 126. Finally, the correspondent 14 checks the security level to ensure it meets predetermined minimum requirements. If either the encryption or authentication fails, or if the security level does not meet the minimum requirements, then the correspondent 14 rejects the message.

It can be recognized that providing security bits and an adjustable security level provides flexibility in protecting each frame of the communication. It is therefore possible for the sender to decide which frames should be encrypted but not authenticated. Since authentication typically increases the length of a message, this provides a savings in constrained environments bandwidth is at a premium.

In a further embodiment, the correspondent 12 wishes to send the same message to multiple recipients 14 with varying minimum security requirements. In this case, the correspondent 12 chooses a security level high enough to meet all of the requirements. The correspondent 12 then proceeds as in FIG. 4 to assemble and send message with the security level. The message will be accepted by each recipient since it meets each of their minimum requirements. It can be recognized that this embodiment provides greater efficiency than separately dealing with each recipient's requirements.

In another embodiment, a different number of security bits are used. The actual number of bits is not limited to any one value, but rather may be predetermined for any given application. The security bits should indicate algorithm parameters. They may be used to determine the length of a key as 40 bits or 128 bits, the version of a key to be used, or any other parameters of the encryption system.

Although the invention has been described with reference to certain specific embodiments, various modifications thereof will be apparent to those skilled in the art without departing from the spirit and scope of the invention as outlined in the claims appended hereto.

The invention claimed is:

1. A method for providing security in an electronic communication system, comprising:
   preparing, by a communication device, a plurality of frames, wherein each individual frame in the plurality of frames has a header and data, wherein the preparing the plurality of frames comprises;
   for each individual frame:
   determining a security level for the individual frame, the security level indicating whether to provide encryption for the individual frame and whether to provide integrity for the individual frame;
   based on the security level, including security control bits in the header of the individual frame, wherein the security control bits include one or more security mode bits and integrity level bits, the one or more security mode bits indicate whether encryption is on or off, the integrity level bits indicate which of at least three integrity levels is utilized, the integrity levels corresponding to signing operations of a sender of increasing strength; and
   encrypting the data according to the security level for the frame; and
   transmitting the plurality of frames to a recipient device.

2. The method of claim 1, further comprising receiving a frame, wherein the frame indicates a version of a key to be used in an encryption system.

3. The method of claim 1, wherein the communication device provides the plurality of frames for transmission to a plurality of recipients, and determining the security level includes determining a minimum security level to satisfy the plurality of recipients, wherein the security control bits are based on the minimum security level.

4. The method of claim 1, wherein the security level is determined based on predetermined minimum requirements.

5. The method of claim 4, wherein the predetermined minimum requirements are determined among the communication device and at least one recipient device based on an agreed-upon rule.

6. The method of claim 1, wherein the security level is determined based upon content of the individual frame.

7. The method of claim 1, wherein the security control bits include an indication of a cryptographic algorithm parameter.

8. The method of claim 1, further comprising: signing the header and data for each individual frame according to the security level for the frame.

9. The method of claim 1, wherein a number of integrity levels is three, and the integrity levels correspond to key lengths of 32, 64, and 128 bits.

10. The method of claim 1, wherein one of the integrity levels uses a key length of 128 bits.

11. A communication device, comprising:
   at least one hardware processor; and
   a non-transitory computer-readable storage medium coupled to the at least one hardware processor and storing programming instructions for execution by the at least one hardware processor, wherein the programming instructions, when executed, cause the communication device to perform operations comprising:
   preparing, by the communication device, a plurality of frames, wherein each individual frame in the plurality of frames has a header and data, wherein the preparing the plurality of frames comprises;
   for each individual frame:
   determining a security level for the individual frame, the security level indicating whether to provide encryption for the individual frame and whether to provide integrity for the individual frame;
   based on the security level, including security control bits in the header of the individual frame, wherein the security control bits include one or more security mode bits and integrity level bits, the one or more security mode bits indicate whether encryption is on or off, the integrity level bits indicate which of at least three integrity levels is utilized, the integrity levels corresponding to signing operations of a sender of increasing strength; and encrypting the data according to the security level for the frame; and transmitting the plurality of frames to a recipient device.

12. The communication device of claim 11, the operations further comprising receiving a frame, wherein the frame indicates a version of a key to be used in an encryption system.

13. The communication device of claim 11, wherein the communication device provides the plurality of frames for transmission to a plurality of recipients, and determining the security level includes determining a minimum security level to satisfy the plurality of recipients, wherein the security control bits are based on the minimum security level.

14. The communication device of claim 11, wherein the security level is determined based on predetermined minimum requirements.

15. The communication device of claim 14, wherein the predetermined minimum requirements are determined among the communication device and at least one recipient device based on an agreed-upon rule.

16. The communication device of claim 11, wherein the security level is determined based upon content of the individual frame.

17. A non-transitory computer-readable medium storing instructions which, when executed, cause a communication device to perform operations comprising:

preparing, by the communication device, a plurality of frames, wherein each individual frame in the plurality of frames has a header and data, wherein the preparing the plurality of frames comprises;

for each individual frame:

determining a security level for the individual frame, the security level indicating whether to provide encryption for the individual frame and whether to provide integrity for the individual frame;

based on the security level, including security control bits in the header of the individual frame, wherein the security control bits include one or more security mode bits and integrity level bits, the one or more security mode bits indicate whether encryption is on or off, the integrity level bits indicate which of at least three integrity levels is utilized, the integrity levels corresponding to signing operations of a sender of increasing strength; and encrypting the data according to the security level for the frame; and transmitting the plurality of frames to a recipient device.

18. The non-transitory computer-readable medium of claim 17, the operations further comprising receiving a frame, wherein the frame indicates a version of a key to be used in an encryption system.

19. The non-transitory computer-readable medium of claim 17, wherein the communication device provides the plurality of frames for transmission to a plurality of recipients, and determining the security level includes determining a minimum security level to satisfy the plurality of recipients, wherein the security control bits are based on the minimum security level.

* * * * *